Dec. 20, 1927.
G. L. SMITH ET AL
1,653,516
WHEEL LIFTER
Filed June 30, 1924
2 Sheets-Sheet 1
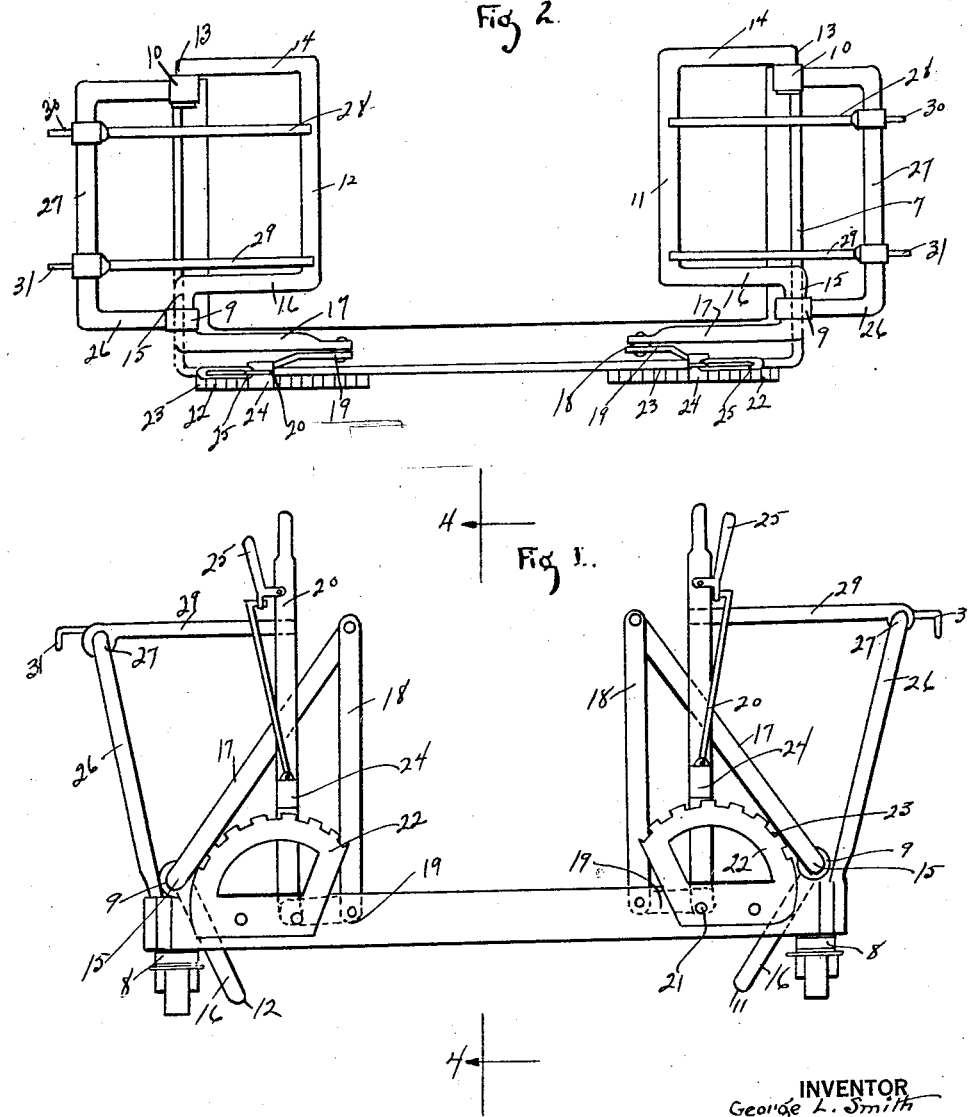
INVENTOR
George L. Smith
Robert Munce
BY
Francis C. Huebner
ATTORNEY Dec. 20, 1927.

G. L. SMITH ET AL.

WHEEL LIFTER

Filed June 30, 1924

INVENTORS
GEORGE L. SMITH
ROBERT MUNCE
by Frank Westerfield
ATTORNEY.

Patented Dec. 20, 1927.

1,653,516

UNITED STATES PATENT OFFICE.

GEORGE L. SMITH AND ROBERT MUNCE, OF FRESNO, CALIFORNIA.

WHEEL LIFTER.

Application filed June 30, 1924. Serial No. 723,155.

Our invention relates primarily to a device for use in removing and replacing the wheels of trucks and the like when necessary, and more particularly when it is desired to change the solid rubber tires thereof.

As is well known, heavy duty trucks are equipped with solid rubber tires and these tires are vulcanized upon a rim which is of a size to snugly fit the felloe of the wheel, and in order to remove these tires it is necessary to remove the wheel and place the same in a press by means of which the tire and rim are forced or pressed from the felloe of the wheel. In replacing the tire this operation is reversed. Inasmuch as the wheels and tires of heavy duty trucks are very heavy it has been customary heretofore to use a greased board by means of which the wheel is slid from the axle to the ground. This operation is attendant with great danger to the workmen and has frequently resulted in serious injury.

It is the object of our invention to provide a device which may be positioned beneath the wheel to be removed and which may be operated to elevate the wheel to facilitate its removal from the axle and when the same is removed to transport it to the press, and vice versa.

Another object is to provide a device of the above character which will be simple and efficient in operation and will require the minimum amount of labor to operate the same.

A further object is to provide a device of the above character which may be adjusted to accommodate varying diameters and widths of wheels.

Other objects and advantages will appear hereinafter and, while we have shown and will describe the preferred form of our invention, we wish it understood that we do not limit ourselves to such preferred form, but that various changes and adaptations may be made therein without departing from the spirit of our invention.

In the drawings accompanying and forming a part hereof:

Fig. 1 is an outside elevation of our device in its inoperative position.

Fig. 2 is a top plan of Fig. 1.

Figure 4:
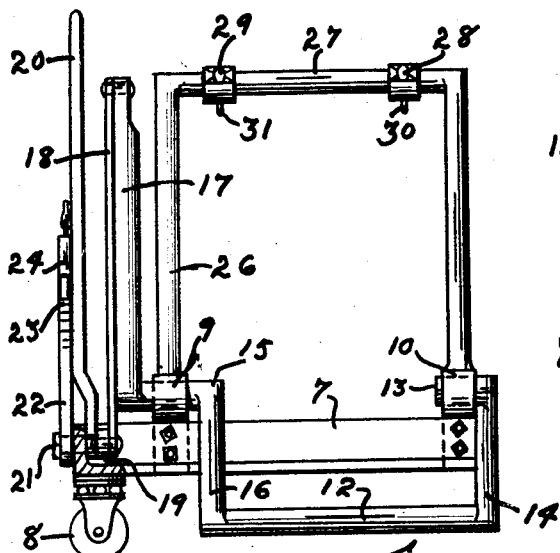
Fig. 4 is an enlarged vertical section on the line 4—4 of Fig. 1.
Figure 5:
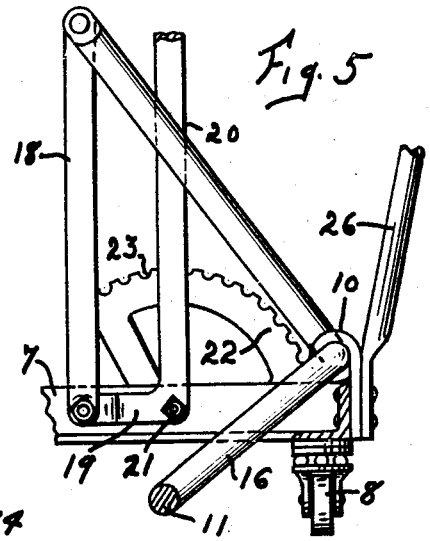
Fig. 5 is an enlarged detail of the elevating mechanism.
Figure 3:
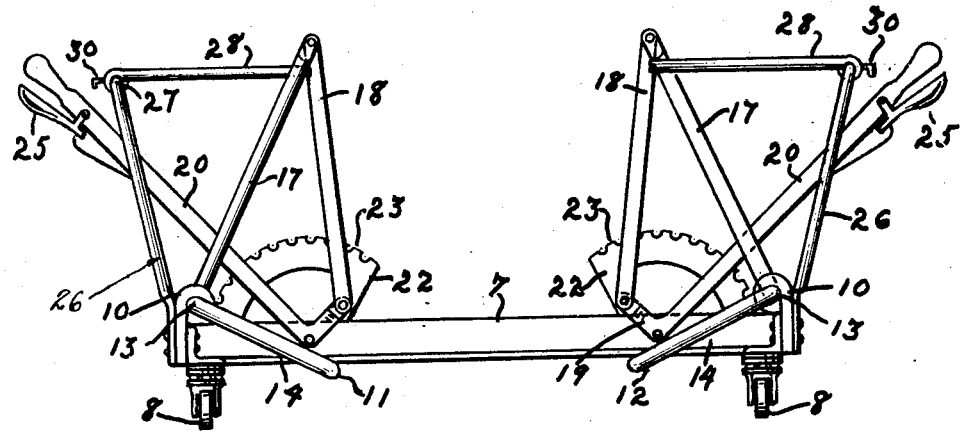
Fig. 3 is an inner side elevation of our device in its operative position.

Referring to the drawings, our device comprises a frame or bed 7, preferably formed of angle iron and being substantially U-shaped in top plan. Secured to each of the lower corners of frame 7 are castor wheels 8 by means of which frame 7 may be propelled in any direction. Secured to the outer sides of the legs of frame 7, near each end thereof, are bearings 9 and 10 and in these bearings are rockably mounted the wheel engaging members 11 and 12. Members 11 and 12 are preferably substantially U-shaped in top plan. The free ends 13 of legs 14 of members 11 and 12 are bent inwardly at a right angle and are rockably mounted in bearings 10. The ends 15 of the legs 16 of members 11 and 12 are bent outwardly and are rockably supported in bearings 9. Extending upwardly and inwardly from the ends 15, preferably integral therewith, are operating arms 17 which preferably extend at a right angle to the legs 14 and 16, and pivotally connected to the upper ends of members 17 is one of the ends of links 18 the other ends of which extend downwardly and are pivotally connected to the outwardly extending portions 19 of the operating levers 20. Levers 20 are preferably L-shaped in side elevation and are pivotally connected at 21 to frame 7. Secured to the outer sides of frame 7 are toothed segments 22 provided with teeth or notches 23. Mounted upon the sides of levers 20 are ratchets 24, of any desired construction, adapted to be operated by handles 25 upon the upper ends of levers 20, in the usual well known manner. Secured at their lower ends to the outer faces of bearings 9 and 10, on opposite ends of frame 7, by rivets or otherwise, are substantially inverted U-shaped brackets 26 upon the upper cross bars 27 of which are adjustably mounted the wheel supporting arms 28 and 29 provided with locking screws 30 and 31 by means of which the positions of members 28 and 29 may be adjusted to suit the width of the particular wheel being handled.

In the operation of our device the same will be in the position shown in Figs. 1 and 2. When it is desired to use the same for lifting a wheel, the end of the axle upon which the wheel is mounted will be jacked up in the usual manner. Our device will then be propelled beneath the wheel with members 11 and 12 resting upon opposite sides and near the bottom, it being understood that members 28 will first be loosened and permitted to hang downwardly. Members 28 will then be positioned upon the inner side of the wheel; handles 25 will then be moved outwardly and, by means of the projecting portions 19, will elevate links 18. The elevation of links 18 will in turn elevate the upper ends of members 17 causing the ends 13 and 15 to rotate in bearings 9 and 10, thereby elevating members 11 and 12, which in turn will engage and elevate the wheel being removed. When the wheel has been raised the desired distance handles 25 will be released to permit the ratches 24 to engage one of the notches 23 in the segments 22. The device will then be moved outwardly, thus removing the wheel from the axle, when it may be transported to any desired place. Upon reaching the desired place levers 20 will be moved inwardly, thereby permitting the wheel to descend into contact with the floor. In replacing the wheel this operation will be reversed.

Having described our invention, what we claim is:

1. A wheel lifter comprising a frame substantially U-shaped in top plan; a bearing secured to each end of each of the legs of said frame; wheel engaging members pivotally mounted at their ends in said bearings and extending inwardly therefrom; an arm secured to said wheel engaging members at one end thereof and extending upwardly at a right angle thereto; operating levers pivotally mounted in said frame; a link connecting said operating levers with the free ends of said arms, whereby outward movement of said levers will rock said wheel engaging members; and means carried by said levers to lock the same in their adjusted positions.

2. A wheel lifter comprising a frame open at one side, being adapted to be moved to surround a vehicle wheel except on the inner side thereof; wheels supporting said frame capable of movement in any direction; wheel engaging members rockably mounted in said frame to extend inwardly towards each other; arms connected to said wheel engaging members to extend upwardly at a right angle therefrom; an operating lever for each of said wheel engaging members; a projection from the lower ends of each of said operating levers; links connecting the free ends of said projections with the free ends of said arms, whereby movement of said operating levers will be communicated to said wheel engaging members; means between said operating levers and said frame for locking said levers in their adjusted positions; brackets extending upwardly and outwardly from the outer faces of the ends of said frame; and supporting arms carried by said brackets capable of being positioned to support a wheel carried by said wheel supporting means.

In witness that we claim the foregoing we have hereunto set our hands this 29th day of May, 1924.

GEORGE L. SMITH.
ROBERT MUNCE.